United States Patent
Manners et al.

(10) Patent No.: US 6,938,586 B2
(45) Date of Patent: Sep. 6, 2005

(54) PROPORTIONAL VALVE

(75) Inventors: Paul Manners, Palgrave (CA); Ronald G. Stark, Brampton (CA); Alex Colas, Bolton (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 10/619,659

(22) Filed: Jul. 15, 2003

(65) Prior Publication Data

US 2004/0083987 A1 May 6, 2004

Related U.S. Application Data

(60) Provisional application No. 60/396,431, filed on Jul. 15, 2002.

(51) Int. Cl.$^7$ .................................................. F01P 7/14
(52) U.S. Cl. ................................. 123/41.1; 137/875
(58) Field of Search .................. 123/41.1, 41.08, 123/41.09; 236/34.5; 137/875, 876, 625.44

(56) References Cited

U.S. PATENT DOCUMENTS

| | | | |
|---|---|---|---|
| 3,115,159 A | * 12/1963 | Roku | ............. 137/606 |
| 5,529,026 A | 6/1996 | Kurr et al. | |
| 6,435,143 B2 | 8/2002 | Hollis | |
| 6,745,995 B2 | * 6/2004 | Hu et al. | ............. 251/81 |

FOREIGN PATENT DOCUMENTS

| | | |
|---|---|---|
| DE | 10014555 A | 10/2000 |
| DE | 19921421 A | 11/2000 |
| FR | 2800125 A | 4/2001 |
| GB | 1 321 593 | 6/1969 |

\* cited by examiner

*Primary Examiner*—Henry C. Yuen
*Assistant Examiner*—Hyder Ali
(74) *Attorney, Agent, or Firm*—Clark Hill PLC

(57) ABSTRACT

A valve for automatically and proportionally adjusting fluid flow between an engine and a radiator for cooling the fluid heated by the engine in response to changes in fluid temperature within a range of operating temperatures. The valve includes a housing having a chamber. The housing includes a radiator flow port for passing fluid between the radiator and the chamber. A vane pivotally disposed in the chamber has a vane wall engagable with the radiator port for restricting fluid flow. A drive assembly is operatively coupled to the vane for varying the position of the vane within the chamber.

14 Claims, 4 Drawing Sheets

PROPORTIONAL VALVE

CROSS-REFERENCE TO RELATED APPLICATION

This application claims priority to and all the benefits of U.S. Provisional Application No. 60/396,431, filed on Jul. 15, 2002.

BACKGROUND OF THE INVENTION

1. Field of the Invention

The invention relates to a valve for regulating flow of coolant fluid between a combustion engine and a radiator in an automotive vehicle.

2. Description of the Prior Art

Internal combustion engines for automotive vehicles generate heat from the combustion of fuel and friction between the many moving components within the engine, such as the between the engine block and the pistons. An engine-driven impeller propels coolant fluid between flow paths formed within the engine block and a heat sink or radiator exposed to ambient airflow passing over the surface of the radiator for carrying the heat away from the engine block Hoses are typically used to carry coolant fluid between the engine block and the radiator.

Typically, a wax valve or thermostat is coupled between the engine block and the radiator to control the flow of coolant fluid from the engine block to the radiator. Below a predetermined temperature, the thermostat is closed to restrict coolant fluid flow from the engine block to the radiator, which expedites warming of the engine. Above the predetermined temperature, a wax element within the thermostat expands proportionally in response to the rising coolant fluid temperature to mechanically engage and open a valve within the thermostat to allow coolant fluid to flow from the engine block to the radiator. In the radiator, the coolant fluid from the engine is cooled by heat exchange with ambient airflow passing over the surface of the radiator. The cooled coolant fluid passes from the radiator to the engine block and the coolant fluid is again heated by the combustion cycle and friction generated within the engine. The valve is spring biased closed so that within a range of temperatures around the predetermined temperature, the valve opening varies in size roughly in proportion to the coolant fluid temperature. However, wax thermostats are generally slow to respond to engine block temperature and are susceptible to failure due to clogging by contaminates commonly born within the coolant fluid due to corrosion within the engine block and radiator.

It remains desirable to provide a thermostat or valve that can be actively opened and closed to allow or restrict the flow of coolant fluid between the engine block and radiator in response to a wider range of engine variables and states over conventional wax thermostats. Further, it remains desirable to provide a valve that is resistant to the contaminants in the coolant fluid.

SUMMARY OF THE INVENTION

A valve proportionally controls the fluid flow between an engine and a radiator in an automotive vehicle. The valve includes a housing having a chamber coupled between the engine and the radiator. A radiator port extends between the radiator and the first end of the chamber for passing coolant between the radiator and the chamber. A bypass port extends between an outlet from the engine and the chamber for passing coolant flowing between the engine and the chamber. An engine port extends between an inlet from the engine and the chamber for passing coolant flowing from one or both of the radiator or bypass ports between the inlet of the engine and the chamber. A vane is disposed within the chamber and is pivotally coupled to the chamber for moving the arcuate plunger in and out of the arcuate neck for decreasing or increasing, respectively, fluid flow between the radiator and the engine through the housing, for adjusting a flow of fluid within the chamber. A drive assembly is operatively coupled with the vane for automatically varying the position of the vane within the chamber for proportionally controlling the amount of fluid flow between the radiator and the engine in response to changes in the temperature of the fluid within a predetermined operating temperature range.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
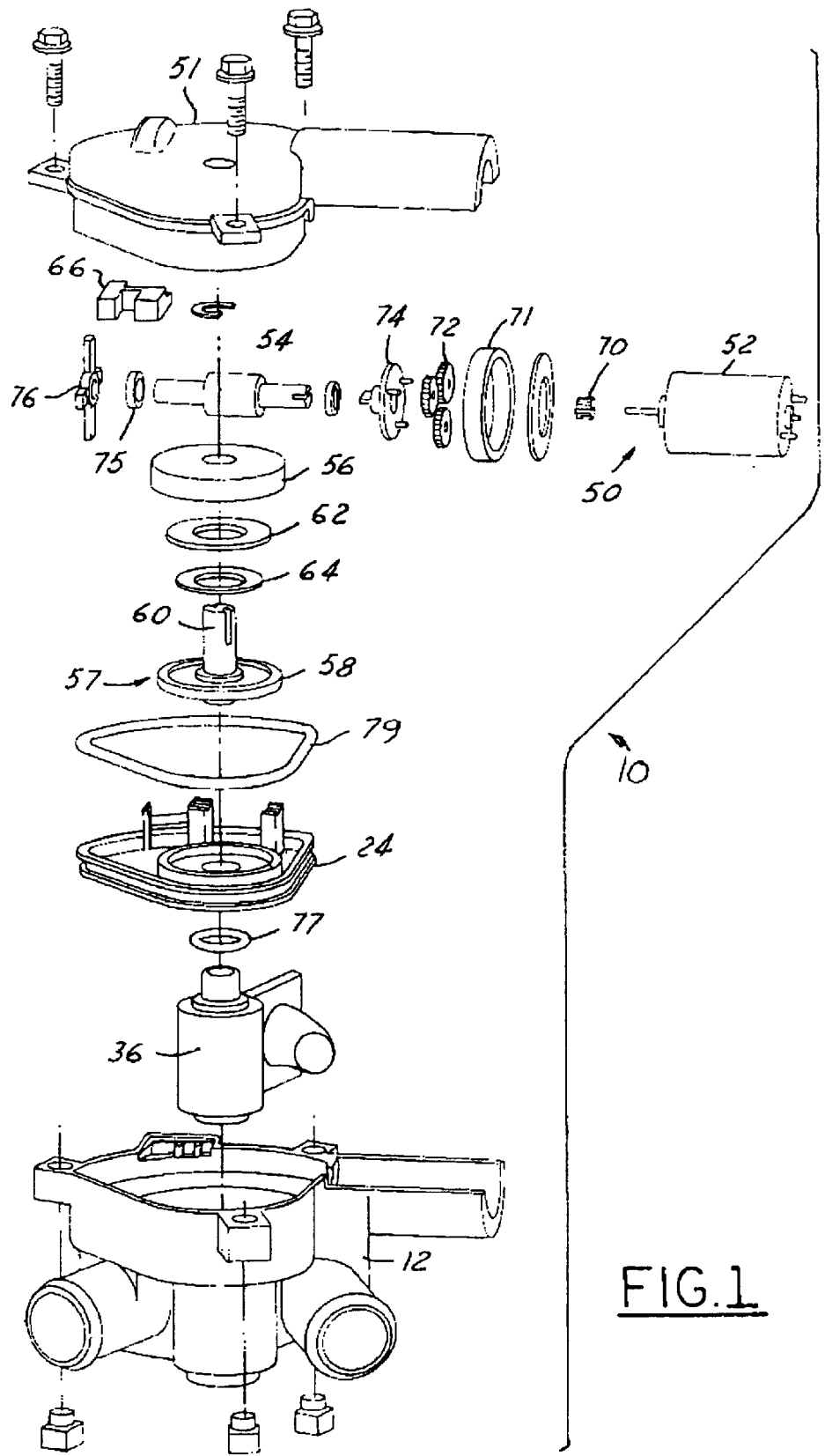
FIG. 1 is an exploded view of a valve according to one embodiment of the invention.
Figure 2:
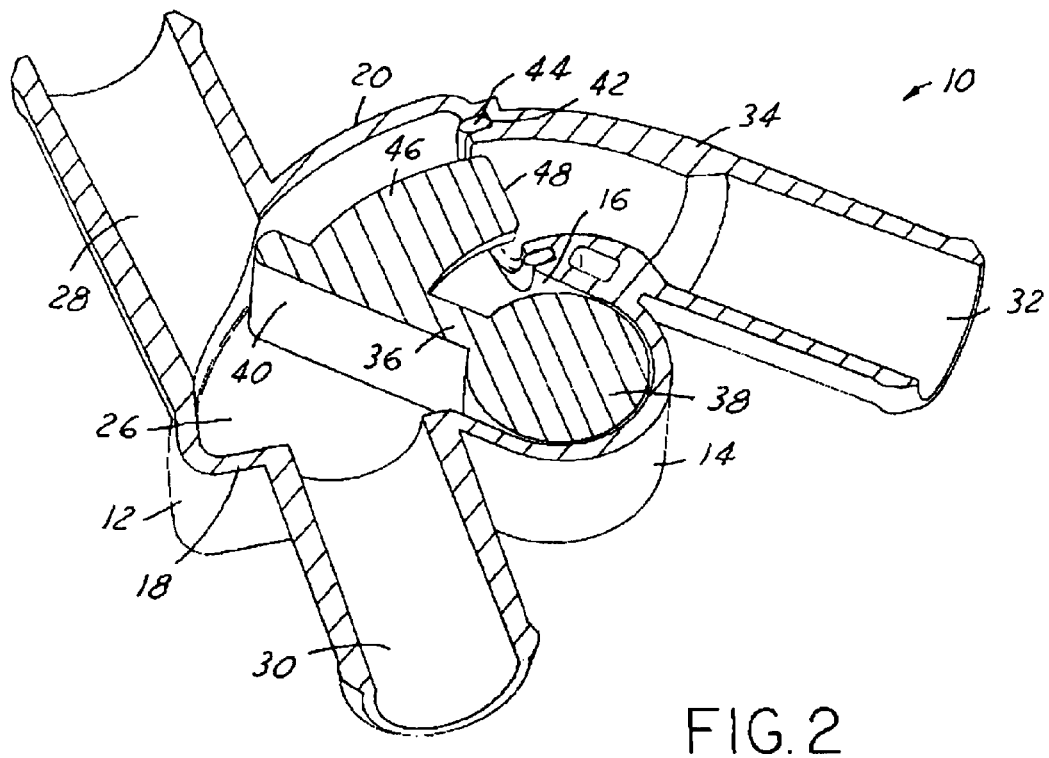
FIG. 2 is a cut away perspective view of the valve in an open state.
Figure 3:
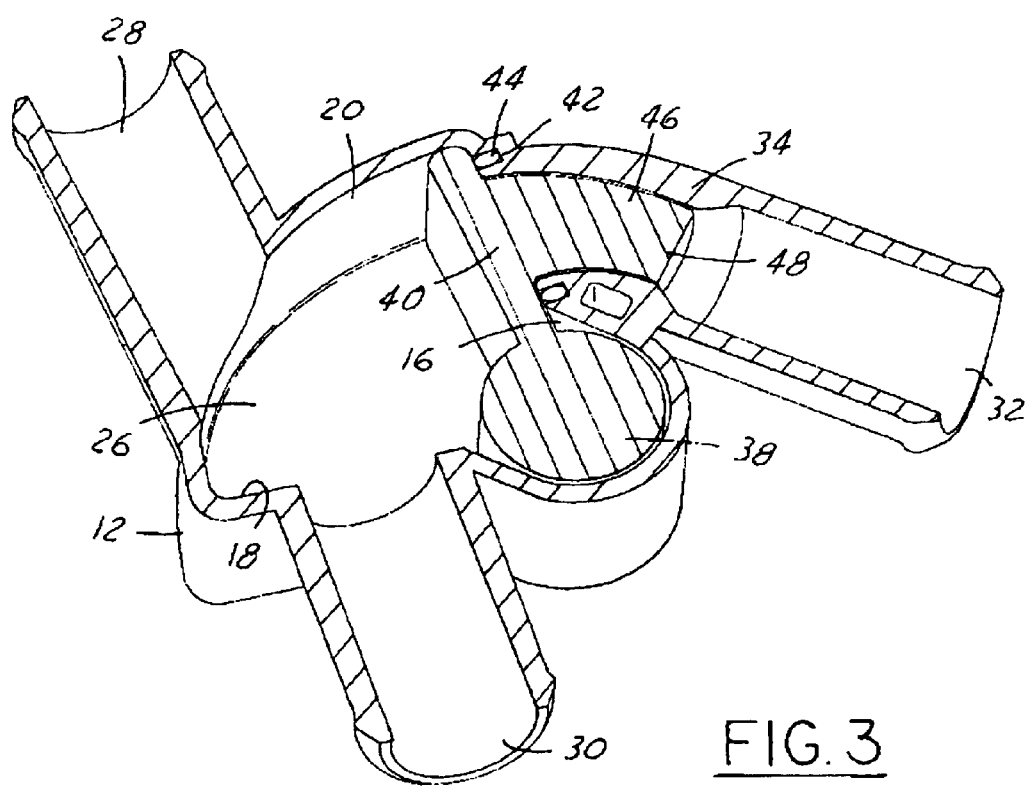
FIG. 3 is a cut away perspective view of the valve in a closed state.
Figure 4:
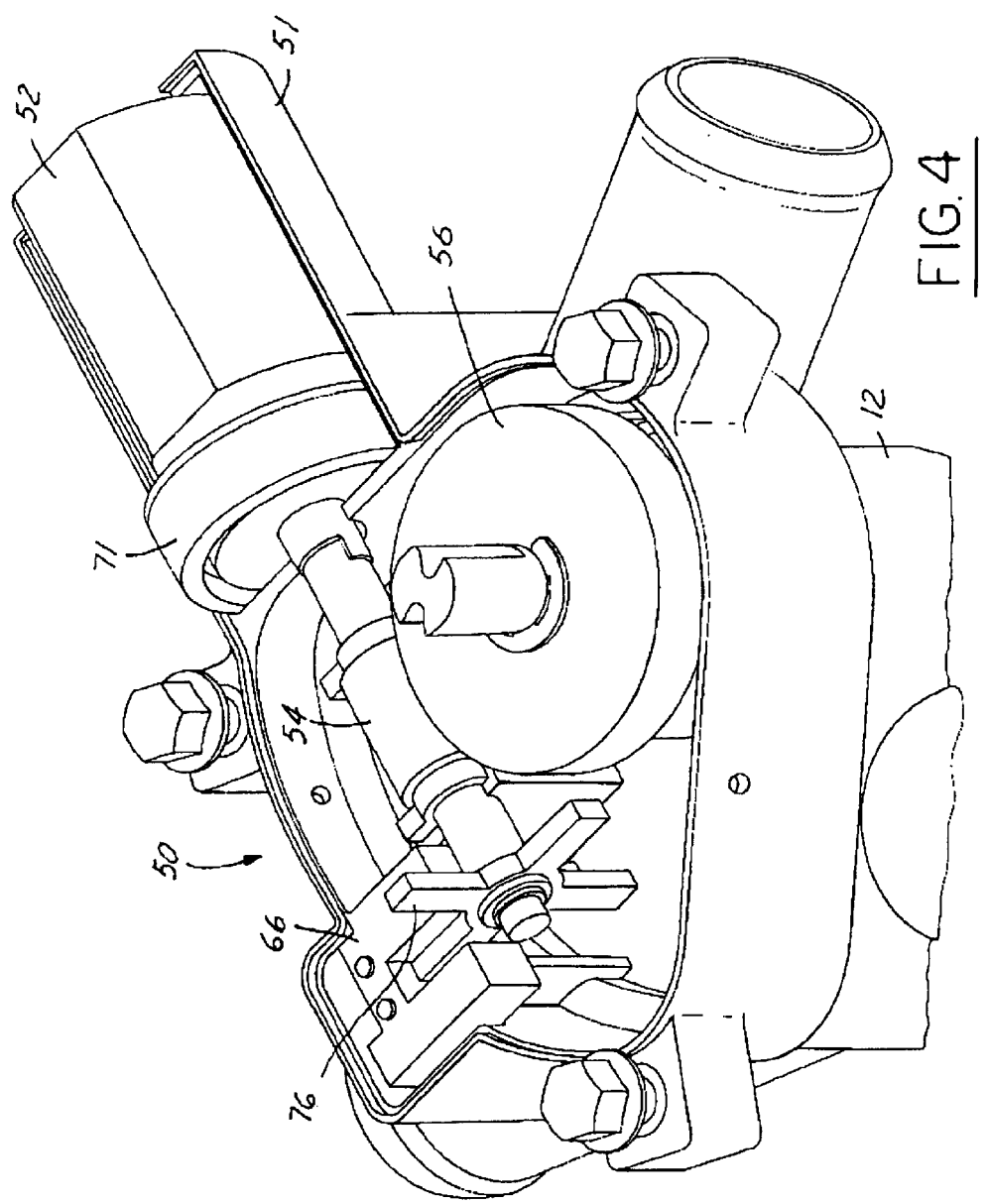
FIG. 4 is a perspective top view of the valve and a drive assembly for actuating the valve.
Figure 5:
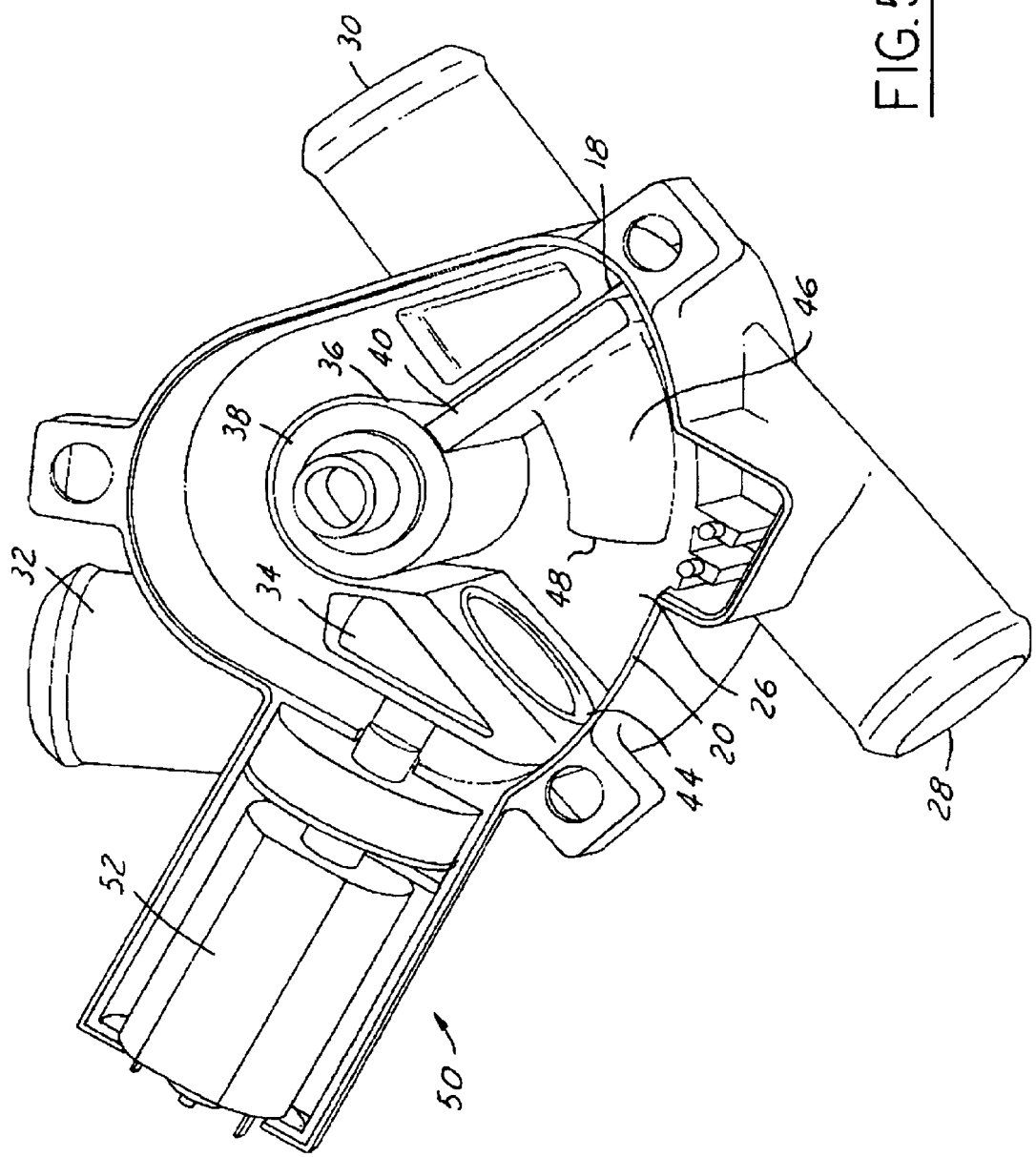
FIG. 5 is a perspective bottom view of the valve and the drive assembly for actuating the valve.

Referring to FIGS. 1–5, a proportional valve 10 is shown for regulating the flow of coolant fluid between an engine (not shown) and a radiator (not shown) in an automotive vehicle. The valve 10 includes a molded housing 12. The housing 12 includes a generally cylindrical vane support portion 14. Opposing first and second chamber walls 16, 18 extend radially from the vane support portion 14. A third chamber wall 20 spaced apart from the vane support portion 14 extends arcuately between the first and second chamber walls 16, 18. An upper chamber wall 22 and a lower chamber wall 24 each extend between the first, second and third chamber walls 16, 18, 20 to define a generally wedge-shaped and substantially closed fluid chamber 26 therebetween.

An engine flow port 28 is formed in the third chamber wall 20 for passing fluid between the engine and the chamber 26. A bypass flow port 30 is formed in the second chamber wall 18 for passing fluid between the engine and the chamber 26. A radiator flow port 32 is formed in a portion of the first chamber wall 16 for passing fluid between the radiator and the chamber 26. An arcuate neck 34 is formed in the radiator flow port 30 adjacent the first chamber wall 16.

A vane 36 is pivotally carried by the vane support portion 14 for pivotal movement within the chamber 26 between the first and second chamber walls 16, 18 for controlling the flow of fluid between the chamber 26, and any of the engine, bypass and radiator flow ports 28, 30, 32.

In a preferred aspect of the invention, the vane 36 includes a cylindrical base 38 pivotally carried by the vane support portion 14. A vane wall 40 extends radially outwardly from the base 38 between the base 38 and the third chamber wall 20. The vane wall 40 pivotally swings between a first position in which the vane wall 40 engages the first chamber wall 16 and a second position in which the vane wall 40 engages the second chamber wall 18. The vane wall 40 travels between the first and second positions in response to corresponding pivotal movement of the base 38 within the vane support portion 14.

When in the first position, the vane wall 40 restricts fluid flow between the radiator flow port 32 and the chamber 26 and allows fluid flow between the engine 28 and bypass 30 flow ports. In a preferred embodiment, an annular slot 42 is formed in the first chamber wall 16 facing the chamber 26. A ring shaped vane seal 44 is fixedly held within the annular slot 42 and protrudes axially from the first chamber wall 16 for elastically deforming against the vane wall 40 when the vane wall 40 is engaged with the first chamber wall 16. The vane seal 44, while deformed against the vane wall 40, prevents fluid flow between the radiator flow port 32 and the chamber 26.

A plunger 46 extends arcuately between the vane wall 40 and a distal end 48 for movement in and out of the neck 34 of the radiator flow port 30 as the vane wall 40 is pivoted in and out engagement with the first chamber wall 16, respectively. The plunger 46 tapers from the vane wall 40 toward the distal end 48 in a configuration that mirrors the taper of the neck 34. The taper of the neck 34 defines a profile such that the gap between the inner diameter of the neck 34 and the outer diameter of the plunger 46 remains constant along the entire length of the plunger 46 when the vane wall 40 is engaged with the first chamber wall 16. The neck 34 and the plunger 46 are curved and frustoconical to accommodate the pivotal motion of the vane 36.

When in the second position, the vane wall 40 restricts fluid flow between the chamber 26 and the bypass flow port 30 allowing fluid flow between the engine 28 and radiator 32 flow ports.

A drive assembly 50 is supported within a gear housing 51 fixedly secured to the housing 12 for moving and maintaining the vane 36 between the first and second positions. The drive assembly 50 includes an electric direct current motor 52 for driving a worm 54 and worm gear 56 arrangement. Rotational movement of the worm 54 by the motor 52 causes rotational movement of the worm gear 56. In a preferred aspect of the present invention, the direct current motor 52 includes a shaft coupled to a pinion gear 70 which in turn rotates planetary gears 72 carried by a carrier 74 and ring 71 transferring rotational motion to the worm gear 56. A clutch generally indicated at 57 is coupled between the worm gear 56 and the base 38 of the vane 36 for transferring rotational movement of the worm gear 56 to the vane 36. The clutch also allows relative movement or slip between the worm gear 56 and vane 36 for relieving stress on the motor 52 when the vane 36 stops when engaging the first and second chamber walls 16, 18. Preferably, the clutch 57 includes a clutch housing 58, a shaft 60, a friction disc 62, and a spring disc 64. The clutch housing 58 is secured to the base 38 of the vane 36. The shaft 60 extends axially from the clutch housing 58 through a center bore in the worm gear 56. The friction disc 62 and the spring disc 64 are axially compressed between the clutch housing 58 and the worm gear 56. The friction disc 62 is keyed with the clutch housing 58 for pivotal movement therewith. The spring disc 64 axially forces the friction disc 62 toward the worm gear 56 so that pivotal movement of the worm gear 56 is transferred to the vane 36 by frictional torque created between the friction disc 62 and the worm gear 56. The frictional torque created by the axial compression of the spring disc 64 is predetermined and is generally less than the amount of torque associated with occasional sudden engagement of the vane 36 with the first or second chamber walls 18, 20.

The drive assembly 50 is controlled by a central processor (not shown) in response to temperature or pressure sensors located within the engine. In a preferred aspect of the present invention, a Reed type switch 66 is coupled to the worm 54 for providing positional feedback to the central processor of the vane 36 based on the rotation and position of the worm 54. An encoder 76 may be coupled to the worm 54 by an appropriate bushing 75 to be read by the Reed switch 66 to determine the position of the worm 54. The drive assembly 50 can be sealed from the fluid within the chamber 26 by an O-ring seal 77, as best seen in FIG. 1.

In operation, fluid is propelled through the engine block by an impeller driven by the engine. Until the engine reaches a predetermined operating temperature, the central control processor maintains the vane 36 in its first position engaging the first chamber wall 16. In the first position, the vane wall 40 is seated against the vane seal 44 for preventing fluid flow between the radiator flow port 32 and the chamber 26. As a result, back pressure is created in the radiator, which shunts fluid flow through the radiator and prevents heat transfer from fluid to the ambient air passing over the radiator. The fluid, driven by the impeller, takes the lower pressure path through the bypass flow port 30. Fluid passes freely between the bypass flow port 30 and the engine flow port 28 through the chamber 26. Continued operation of the engine causes the fluid temperature to rise. Once the fluid reaches the predetermined operating temperature, the central control processor commands the drive assembly 50 to pivot the vane wall 40 away from the vane seal 44 and first chamber wall 16 to allow fluid flow between the radiator flow port 32 and the engine flow port 28 through the chamber 26. Fluid flow between the radiator flow port 32 and the chamber 26 relieves back pressure in the radiator, allowing fluid to flow from the engine and through the radiator. Heat energy is transferred from the fluid through the radiator to the ambient air passing over the radiator, lowering the temperature of the fluid.

Movement of the vane wall 40 toward and away from the first chamber wall 16 causes the plunger 46 to move in and out of the neck 34 of the radiator flow port 32. Movement of the plunger 46 in and out of the neck 34 of the radiator flow port 32 decreases and increases, respectively, the fluid flow between the radiator flow port 32 and the chamber 26. The vane wall 40 may be moved and held in any position by the drive assembly 50 between the first and second chamber walls 16, 18 to vary the amount of fluid flow between the bypass and engine flow ports 30, 28 and the radiator and engine flow ports 32, 28. In general, the fluid flow between the bypass and engine flow ports 30, 28 varies inversely and in proportion with the fluid flow between the radiator and engine flow ports 32, 28.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A valve for controlling fluid flow between an engine and a radiator in an automotive vehicle comprising:

a housing disposed between the engine and radiator, the housing having a chamber formed therein;

a radiator port extending between the radiator and the chamber for passing coolant flowing between the radiator and the chamber;

a bypass port extending between an outlet from the engine and the chamber for passing coolant flowing between the engine and the chamber;

an engine port extending between an inlet from the engine and the chamber for passing coolant flowing from one or both of the radiator and bypass ports between the inlet of the engine and the chamber;

a vane disposed within and pivotally coupled to the chamber for adjusting a flow of fluid within the chamber; and a drive assembly operatively coupled to the vane for varying the position of the vane within the chamber wherein fluid flow between the radiator and engine is proportionally controlled based upon a predetermined operating temperature range, wherein the vane has a vane wall extending radially and a tapered plunger extending arcuately from the vane wall, and the radiator flow port includes an arcuate tapered neck, the plunger moving in and out of the neck decreasing and increasing, respectively, fluid flow between the radiator flow port and the chamber.

2. The valve of claim 1 wherein the housing includes a vane support portion integrally formed therewith.

3. The valve of claim 2 wherein the housing comprises:

a first chamber wall extending radially from the vane support portion;

a second chamber wall extending radially from the vane support portion and spaced from the first chamber wall;

a third chamber wall extending arcuately between the first and second chamber walls; and upper and lower chamber walls each coupled with the first, second and third chamber walls.

4. The valve of claim 3 wherein the vane comprises a cylindrical base, the vane wall extending radially outward from the cylindrical base, and the plunger extending arcuately from the vane wall and terminating at a distal end.

5. The valve of claim 4 wherein the first chamber wall includes an annular slot formed therein having a vane seal disposed within the slot for sealing against the vane wall when the valve is in a sealing position relative to the radiator port.

6. The valve of claim 4 wherein the plunger tapers in a direction from the vane wall towards the distal end of the plunger.

7. The valve of claim 6 wherein the taper of the plunger corresponds to the taper of the neck for providing a uniform gap between the plunger and neck.

8. A valve for controlling fluid flow between an engine and a radiator in an automotive vehicle comprising:

a housing coupled between the engine and the radiator, the housing having a chamber and an arcuate tapered neck for passing fluid between the radiator and the engine;

a vane having a vane wall extending radially and an arcuate tapered plunger extending from the vane wall and disposed within the chamber and pivotally coupled to the housing for moving the arcuate plunger in and out of the arcuate neck for regulating fluid flow between the radiator and the engine through the housing; and a drive assembly operatively coupled to the vane for varying the position of the plunger within the neck, wherein fluid flow between the radiator and engine is proportionally controlled based upon a predetermined operating temperature range.

9. The valve of claim 8 wherein the housing includes a vane support portion integrally formed therewith.

10. The valve of claim 9 wherein the housing comprises:

a first chamber wall extending radially from the vane support portion;

a second chamber wall extending radially from the vane support portion and spaced from the first chamber wall;

a third chamber wall extending arcuately between the first and second chamber walls; and upper and lower chamber walls each coupled with the first, second and third chamber walls.

11. The valve of claim 10 wherein the vane comprises a cylindrical base, the vane wall extending radially outward from the cylindrical base, and the plunger extending arcuately from the vane wall and terminating at a distal end.

12. The valve of claim 11 wherein the first chamber wall includes an annular slot formed therein having a vane seal disposed within the slot for sealing against the vane wall when the valve is in a sealing position relative to first chamber wall.

13. The valve of claim 11 wherein the plunger tapers in a direction from the vane wall towards the distal end of the plunger.

14. The valve of claim 13 wherein the taper of the plunger corresponds to the taper of the neck for providing a uniform gap between the plunger and neck.

* * * * *